March 26, 1957  H. GALLUSSER  2,786,747
REDUCTION OF IRON ORES BY CARBON AND STEAM
AND PLANT FOR CARRYING IT INTO EFFECT
Filed April 6, 1954
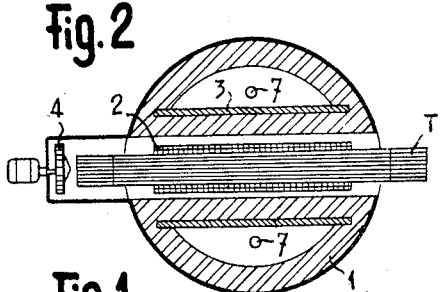
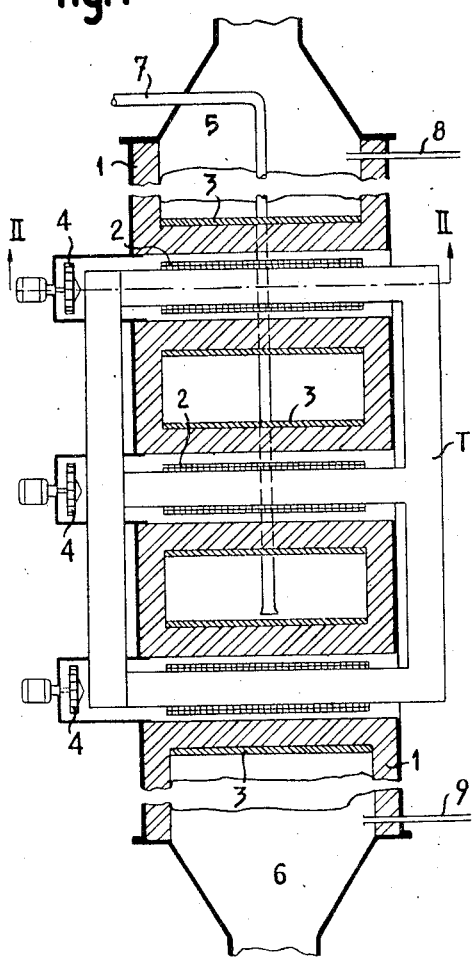
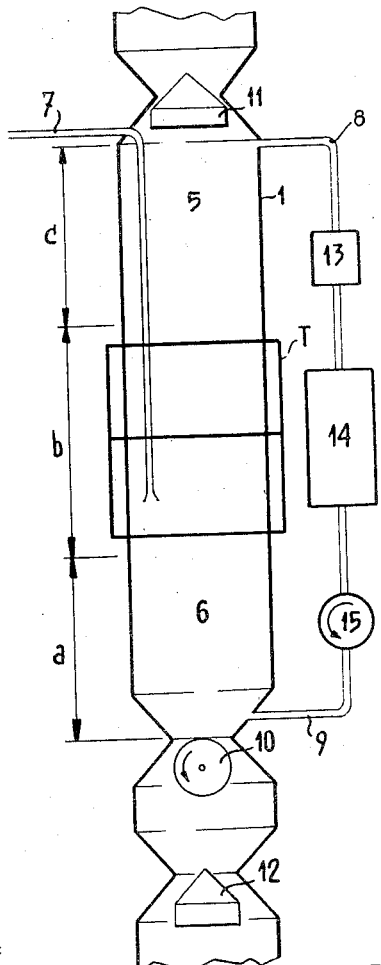
INVENTOR
Hans Gallusser.
BY 
ATTORNEY

United States Patent Office 2,786,747
Patented Mar. 26, 1957

2,786,747

REDUCTION OF IRON ORES BY CARBON AND STEAM AND PLANT FOR CARRYING IT INTO EFFECT

Hans Gallusser, Geneva, Switzerland, assignor to Ateliers des Charmilles S. A., Geneva, Switzerland, a Swiss company Application April 6, 1954, Serial No. 421,311

Claims priority, application Switzerland April 9, 1953

3 Claims. (Cl. 75—11)

It is known that the decomposition of carbon by steam at a temperature of about 950° C. takes place substantially according to the equation.

(I)  $\quad C+H_2O=CO+H_2-27.9$ Kcal.

At this high temperature only unimportant quantities of $CO_2$ are formed.

The two gases CO and $H_2$ are advantageous reduction gases, which at about 950° C. and with a sufficient excess quantity convert $Fe_2O_3$ into Fe, with the formation of $CO_2$ and $H_2O$, according to the Equations II and III.

(II)  $\quad Fe_2O_3+3CO=Fe_2+3CO_2+6$ Kcal.

(III)  $\quad Fe_2O_3+3H_2=Fe_2+3H_2O-26.6$ Kcal.

For Equation III it will be seen that exactly as much water vapour is formed as is necessary, in order to form the two reduction gases 3CO and $3H_2$ from 3C Equation I. By experiments it has been ascertained that additional water vapour must be added to the water vapour formed, so that the Reaction I has a course as complete as possible.

As all three reactions require the same temperature of about 950° C., it is possible to carry out these three reactions in one and the same furnace, on condition, that the temperature for the decomposition of the carbon and for the reduction remains constant. As, however, the Reactions I and III are strongly endothermal, that is to say heat consuming, and the Reaction II is only weakly exothermic, heat must be supplied to the furnace in order to maintain the temperature of about 950° C. constant. This is preferably effected by electric induction heating.

According to the process according to the invention ore and carbon are supplied mixed together to a tightly closed shaft furnace which is heated to the necessary reduction temperature by an electrical induction heating, whilst the reduction gases $H_2$ and CO are produced by the water vapour, formed by the reduction action of $H_2$, supplied to the lower portion of the furnace, and wherein additional water vapour is supplied from the outside into the reduction zone for promoting the decomposition of the carbon.

The plant for carrying the process into effect is characterised in that in the body of the furnace is mounted an induction heater passing therethrough transversely to the axis and at least a water vapour pipe leads into the lower part of the heated zone.

One form of construction of the plant is shown diagrammatically and by way of example in the accompanying drawing, wherein:

Fig. 1 shows the shaft furnace in axial section.

Fig. 2 is a cross-section of Fig. 1 on the line II—II.

Fig. 3 is a diagram of the plant.

In Figs. 1 and 2 of the drawing the furnace body of a shaft furnace is indicated at 1, which is provided with an electrical induction heater in the form of a 3-phase transformer T, of which the limbs carrying the primary windings 2 pass through the furnace body 1 transversely to the axis. The secondary windings 3 each consist of an insulated metal cylinder, which forms a part of the inner wall of the furnace. At the end of each of the wound limbs of the transformer is provided a fan 4 which discharges the heat, developed by the primary windings and that which flows from the heating cylinder towards the winding, through the air gap.

On both sides of the zone occupied by the transformer T are located large chambers 5 and 6, which serve for the exchange of heat between the reduced ore and the ore to be reduced. The chambers 5, 6 respectively are connected to ore supply and removal devices (not shown), whilst known and controlled closure devices are provided in order to prevent the outflow of gas from the furnace.

Into the lower portion of the reduction zone leads at least one pipe 7 for the supply of the additional water vapour.

To the chamber 5 is connected a pipe 8 through which the exhaust gases resulting from the reduction are sucked out and to the chamber 6 is connected a pipe 9 through which the purified exhaust gases are again returned into the furnace.

In Fig. 3 it will be seen that the furnace 1 has three zones $a$, $b$, $c$, that is to say the zone $a$, in which the reduced ore is cooled by the resulting purified and cold exhaust gases, whereby the gases are heated, a zone $b$, which is heated to the reduction temperature by the transformer T, and a zone $c$, in which the ore introduced is heated by the hot gases rising from the reduction, whilst these gases are cooled simultaneously.

Of the supply and discharging devices the drawing only shows a delivery roller 10 located in the lower part of the chamber 6 and of the controlled closure devices only the valves 11 for the closure of the chambers 5 and 12 for the closure of the chamber 6. These valves can be operated mechanically or electrically.

The pipe 8 from the chamber 5 leads to a cooler 13, in which the water still present is condensed. To this cooler is connected a washing plant 14, known per se, in order to remove $CO_2$ resulting from the reduction. The residual $H_2$ and CO gases are withdrawn by a compressor 15 and are returned into the furnace by the pipe 9.

The method of operation of the plant is as follows:

The ore, preferably in a granulated condition, mixed with coke or clear coal, is piped into the furnace and reaches the chamber 5 of the furnace, that is to say the zone $c$, in which the preheating takes place, through controlled closure valves.

After preheating has been effected the ore passes into the zone $b$ which is heated to the reduction temperature by the transformer T and into the lower part of which additional water vapour is introduced by the pipe 7. In this reduction zone the reduction of the ore is effected by the rising gases CO and $H_2$, whereby $CO_2$ and $H_2O$ are produced. This water vapour, combined with the additionally introduced water vapour, effects the decomposition of the carbon into CO and $H_2$, which reduce the iron ore.

The reduced ore now passes into the chamber 6, in which it is cooled completely by the introduced cold reduction gases $H_2$ and CO, by giving off its heat to these gases, whereby they are pre-heated.

From the chamber 6 the reduced ore is discharged in the known manner through the controlled closure valves.

The gas mixture of $H_2$, $H_2O$, CO and $CO_2$ rising in the chamber is sucked out through the pipe 8 and the water present therein is condensed in the cooler 13. In the washing plant 14 the $CO_2$ present in the gas mixture is removed in the known manner, so that only the reduction gases $H_2$ and $CO$ remain, which are again introduced into the chamber 6 by the compressor 15 through the pipe 9.

This process of gasifying the carbon in a shaft furnace, combined with the reintroduction of the purified gases into the furnace, provides the considerable commercial advantage, that the carbon and the gases resulting therefrom are utilised practically completely for the reduction. As a result the coke or coal consumption per ton of iron is considerably smaller than in the usual smelting in a blast furnace.

The furnace can also be operated with an excess pressure, whereby its output capacity is increased in accordance with the higher concentration of the reduction gases.

I claim:

1. A process for reducing iron ore comprising raising a preheated mixture of iron ore and carbon to a temperature of at least 950° C. in a closed shaft furnace, holding said mixture at a temperature of at least 950° C., introducing steam into said mixture, thereby bringing about the reaction of said steam with a portion of said carbon to form carbon monoxide and hydrogen gases, reacting said so-formed gases with a portion of said ore to form iron, carbon dioxide and steam, reacting said so-formed steam with additional carbon to form additional quantities of carbon monoxide and hydrogen gases, further reacting said latter so-formed gases with an additional portion of ore to form iron, carbon dioxide, and steam, removing the unreacted steam and carbon dioxide, and recycling unreacted carbon monoxide and hydrogen gases through said ore, thereby utilizing substantially all of the carbon and the so-formed carbon monoxide and hydrogen gases.

2. The process of claim 1 wherein the ore in said mixture is granulated.

3. A furnace for reducing iron ore comprising a first chamber, means for introducing a mixture of iron ore and carbon into said chamber, a second chamber directly adjacent to said first chamber and contiguous therewith, an electrical induction heater mounted in said second chamber transverse to the axis thereof and constituting a portion of said furnace walls in said second chamber, means for introducing steam into said second chamber at the lower portion thereof, a third chamber directly adjacent to said second chamber and contiguous therewith, means for removing reduced iron from said third chamber, and means for recycling purified exhaust gases, said means being connected to said first and third chambers and including means for removing water from said gases and means for removing carbon dioxide gas from said gases.

References Cited in the file of this patent

UNITED STATES PATENTS

| 1,690,916 | Westberg | Nov. 6, 1928 |
| 2,254,660 | Koller et al. | Sept. 2, 1941 |
| 2,542,028 | Hodge | Feb. 20, 1951 |